(12) United States Patent
Lint et al.

(10) Patent No.: US 9,909,630 B1
(45) Date of Patent: Mar. 6, 2018

(54) CLUTCH SYSTEM

(71) Applicant: FORD GLOBAL TECHNOLOGIES, LLC, Dearborn, MI (US)

(72) Inventors: Brandon David Lint, Dexter, MI (US); Bradley Ronald Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/237,792

(22) Filed: Aug. 16, 2016

(51) Int. Cl.
F16D 25/10 (2006.01)
F16D 25/12 (2006.01)
F16D 25/06 (2006.01)
F16D 13/52 (2006.01)

(52) U.S. Cl.
CPC ............. *F16D 25/10* (2013.01); *F16D 13/52* (2013.01); *F16D 25/06* (2013.01); *F16D 25/12* (2013.01)

(58) Field of Classification Search
CPC .......... F16C 25/10; F16C 13/52; F16C 25/06; F16C 25/12; F16F 3/04
See application file for complete search history.

(56) References Cited

U.S. PATENT DOCUMENTS

| | | | | |
|---|---|---|---|---|
| 5,772,191 A | * | 6/1998 | Nakano | F16F 1/122 267/179 |
| 5,992,834 A | * | 11/1999 | Dover | F16D 13/52 188/72.3 |
| 6,945,371 B2 | * | 9/2005 | Schmidt | F16D 25/0638 188/264 E |
| 2006/0049017 A1 | * | 3/2006 | Furuichi | F16D 13/683 192/30 W |
| 2008/0257675 A1 | | 10/2008 | Sasse et al. | |
| 2016/0116039 A1 | | 4/2016 | Depraete et al. | |
| 2016/0116044 A1 | | 4/2016 | Frait et al. | |

FOREIGN PATENT DOCUMENTS

DE 102006014737 A1 * 10/2007 ......... F16D 25/0638

* cited by examiner

*Primary Examiner* — Stacey A Fluhart
(74) *Attorney, Agent, or Firm* — James Dottavio; Brooks Kushman P.C.

(57) ABSTRACT

A clutch includes a piston, backing plate, spring, and spring retainer. The piston and the backing plate define a balance chamber therebetween. The piston has a protrusion that extends into and defines a pocket in the chamber. The spring is disposed within the pocket and is configured to disengage the piston from a clutch pack. The spring retainer is disposed between the spring and the backing plate. The retainer extends from the backing plate and into the chamber beyond an end of the protrusion.

8 Claims, 2 Drawing Sheets

CLUTCH SYSTEM

TECHNICAL FIELD

The present disclosure relates to clutches that may be utilized in vehicle transmissions.

BACKGROUND

Vehicle transmissions, transaxles, or other mechanisms that employ more than one gearing ratio between an input and an output, may transition between various gear ratios by engaging and disengaging various clutches. The clutches may comprise alternating friction plates and separator plates that are configured to selectively couple two rotating elements (shafts, gears, etc.).

SUMMARY

A clutch includes a piston, backing plate, spring, and spring retainer. The piston and the backing plate define a balance chamber therebetween. The piston has a protrusion that extends into and defines a pocket in the chamber. The spring is disposed within the pocket and is configured to disengage the piston from a clutch pack. The spring retainer is disposed between the spring and the backing plate. The retainer extends from the backing plate and into the chamber beyond an end of the protrusion.

A clutch module includes a first clutch, second clutch, and fluid circuit. The first clutch has a first piston and a first backing plate that define a first balance chamber therebetween, the first piston has a first protrusion that extends into and defines a pocket in the first chamber, and a first spring retainer that extends from the first backing plate and into the first chamber beyond an end of the first protrusion. The second clutch has a second piston and a second backing plate that define a second balance chamber therebetween. The fluid circuit is configured to deliver hydraulic fluid in series to the first chamber and the second chamber such that hydraulic fluid is delivered to the second chamber after the first chamber becomes filled with hydraulic fluid.

A clutch includes a piston, backing plate, and spring retainer. The piston has a first internal surface opposing a second internal surface of the backing plate. The first and second internal surfaces define a balancing chamber therebetween. The first internal surface has a protrusion extending into the chamber. The protrusion and defines a pocket in the chamber. The spring retainer is disposed within the chamber, secured to the second internal surface, and has a profile that faces and parallels first internal surface.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake.

Figure 1:
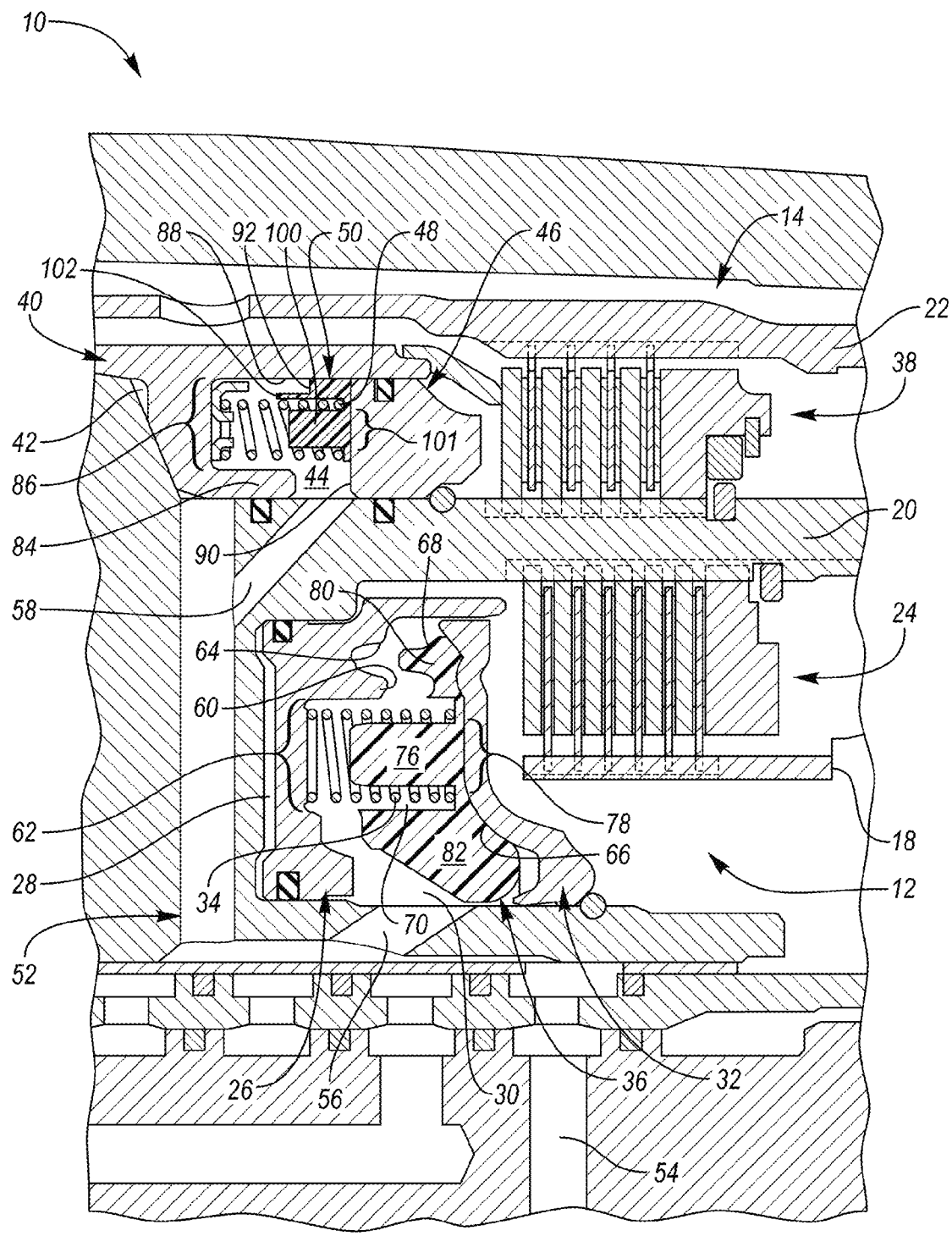
FIG. 1 is a cross-sectional view representative of a clutch module.

Referring to FIG. 1, a cross-sectional view of a clutch module 10 is illustrated. The clutch module 10 includes a first clutch 12 and a second clutch 14. The clutch module 10 may be part of a transmission or transaxle of a vehicle, such as an automobile.

More specifically, the first clutch 12 and the second clutch 14 may be hydraulic clutches. The first clutch 12 may be configured to selectively couple a first rotating element 18 to a second rotating element 20. The second clutch 14 may be configured to selectively couple the second rotating element 20 to a third rotating element 22. Alternatively, the second clutch 14 may be configured to selectively couple third and fourth rotating elements that are not common with the rotating elements that the first clutch 12 is configured to selectively couple to each other. Furthermore, the first clutch 12 and/or the second clutch 14 maybe brakes that are configured to selectively couple one rotating element to a static element, such as a case or housing (e.g., a clutch module housing, transmission housing, or transaxle housing).

The first clutch 12 includes a first clutch pack 24 that includes friction plates and separator plates that are fixedly coupled, in alternating configuration, to either the first rotating element 18 or the second rotating element 20. A first piston 26 is configured to engage and disengage the first clutch pack 24 in order to couple and decouple the first rotating element 18 to and from the second rotating element 20. The first piston 26 engages the first clutch pack 24 when high pressure hydraulic fluid is directed into a first chamber 28 located on an apply side of the first piston 26. The high pressure hydraulic fluid may be directed into the first chamber 28 through a channel that is connected to a high pressure fluid circuit. Low pressure hydraulic fluid may also be directed into a first balancing dam chamber (or first balance chamber) 30 located on the opposing side of the first piston 26 relative to the first chamber 28 located on the apply side of the first piston 26. The low pressure hydraulic fluid may be directed into the first balancing dam chamber 30 through a channel that is connected to a low pressure fluid circuit. A balance dam creates a centrifugal hydraulic pressure that opposes and balances centrifugal hydraulic pressure developed in the first chamber 28 located on the apply side of the first piston 26. These centrifugal pressures are caused by rotation of the components of the first clutch 12. Directing hydraulic fluid into the first balance dam chamber 30 eliminates or reduces the pressure effects caused by the speed of rotation so that the control system pressure (i.e., the hydraulic pressure commanded to the first chamber 28 located on the apply side of the first piston 26) alone creates the necessary force for the first piston 26 to engage the first clutch pack 24.

The first clutch 12 may also include a first backing plate 32 disposed between the first piston 26 and the first clutch pack 24. The first balancing dam chamber 30 may be defined between the first piston 26 and the first backing plate 32. Hydraulic fluid may be vented from the first balancing dam chamber 30 while engaging the first piston 26 and the first clutch pack 24. A first compression spring 34 is configured to disengage the first piston 26 from the first clutch pack 24 when hydraulic fluid is vented from the first chamber 28 located on the apply side of the first piston 26. The first compression spring 34 may push against the first backing plate 32, which provides a reaction force, to disengage the first piston 26 from the first clutch pack 24. A first spring retainer 36 may be disposed between the first backing plate 32 and the first compression spring 34. An additional spring retainer may be disposed between the first piston 26 and the first compression spring 34.

The second clutch 14 includes a second clutch pack 38 that includes friction plates and separator plates that are fixedly coupled, in alternating configuration, to either the second rotating element 20 or the third rotating element 22. A second piston 40 is configured to engage and disengage the second clutch pack 38 in order to couple and decouple the second rotating element 20 to and from the third rotating element 22. The second piston 40 engages the second clutch pack 38 when high pressure hydraulic fluid is directed into a second chamber 42 located on an apply side of the second piston 40. The high pressure hydraulic fluid may be directed into the second chamber 42 through a channel that is connected to a high pressure fluid circuit. Low pressure hydraulic fluid may also be directed into a second balancing dam chamber (or second balance chamber) 44 located on the opposing side of the second piston 40 relative to the second chamber 42 located on the apply side of the second piston 40. The low pressure hydraulic fluid may be directed into the second balancing dam chamber 44 through a channel that is connected to a low pressure fluid circuit. A balance dam creates a centrifugal hydraulic pressure that opposes and balances centrifugal hydraulic pressure developed in the second chamber 42 located on the apply side of the second piston 40. These centrifugal pressures are caused by rotation of the components of the second clutch 14. Directing hydraulic fluid into the second balance dam chamber 44 eliminates or reduces the pressure effects caused by the speed of rotation so that the control system pressure (i.e., the hydraulic pressure commanded to the second chamber 42 located on the apply side of the second piston 40) alone creates the necessary force for the second piston 40 to engage the second clutch pack 38.

The second clutch 14 may also include a second backing plate 46 disposed between the second piston 40 and the second clutch pack 38. The second balancing dam chamber 44 may be defined between the second piston 40 and the second backing plate 46. Hydraulic fluid may be vented from the second balancing dam chamber 44 while engaging the second piston 40 and the second clutch pack 38. A second compression spring 48 is configured to disengage the second piston 40 from the second clutch pack 38 when hydraulic fluid is vented from the second chamber 42 located on the apply side of the second piston 40. The second compression spring 48 may push against the second backing plate 46, which provides a reaction force, to disengage the second piston 40 from the second clutch pack 38. A second spring retainer 50 may be disposed between the second backing plate 46 and the second compression spring 48. An additional spring retainer may be disposed between the second piston 40 and the second compression spring 48.

The clutch module 10 includes a fluid circuit 52 is configured to deliver hydraulic fluid to the first balancing dam chamber 30 and the second balancing dam chamber 44. The fluid circuit 52 may be a low pressure hydraulic fluid circuit. The fluid circuit 52 may include a feed line 54 that supplies hydraulic fluid to the fluid circuit 52. A device, such as a pump, may be used to supply hydraulic fluid from the feed line 54 to the fluid circuit 52. The fluid circuit may include a first inlet 56 to the first balancing dam chamber 30 and a second inlet 58 to the second balancing dam chamber 44. The fluid circuit 52 may be configured to deliver hydraulic fluid, in series, first to the first balancing dam chamber 30 and then to the second balancing dam chamber 44 after the first balancing dam chamber 30 has become filled with hydraulic fluid. Alternatively, the fluid circuit 52 may be configured to deliver hydraulic fluid or in parallel, simultaneously filling the first balancing dam chamber 30 and the second balancing dam chamber 44.

Figure 2:
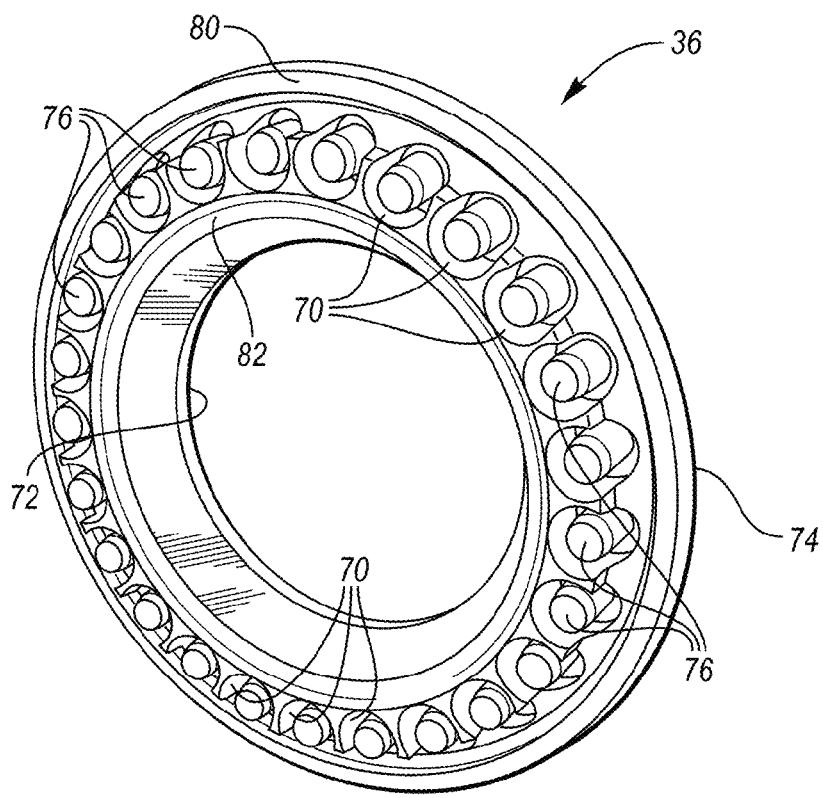
FIG. 2 is an isometric view of a first embodiment of a spring retaining mechanism.
Figure 3:
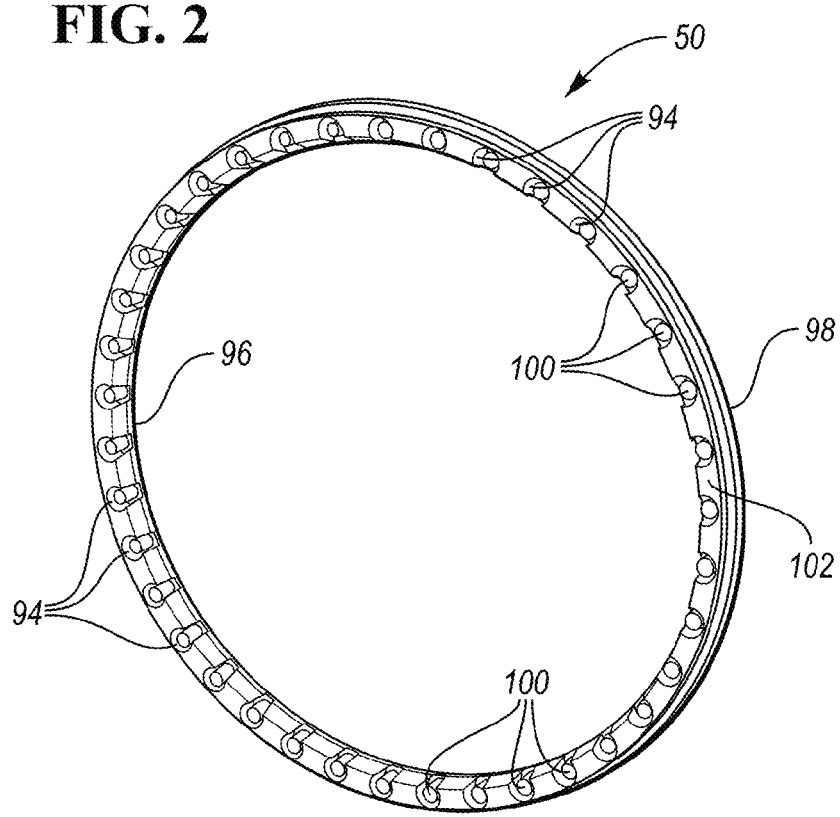
FIG. 3 is an isometric view of a second embodiment of a spring retaining mechanism.

Referring to FIGS. 1-3, the first piston 26, first spring retainer 36, second piston 40, and second spring retainer 50 are described in further detail. The first piston 26 may include a first protrusion 60 that extends into the first balancing dam chamber 30. The first protrusion 60 may define a first pocket 62 within the first balancing dam chamber 30. The first pocket 62 may be sized to receive the first compression spring 34. The first compression spring 34 may be disposed within the first pocket 62. The first spring retainer 36 may be disposed within the first balancing dam chamber 30. The first spring retainer 36 may extend from the first backing plate 32 and into the first balancing dam chamber 30 beyond an end of the first protrusion 60. The first piston 26 may have a first internal surface 64. The first backing plate 32 may have a second internal surface 66 that opposes the first internal surface 64 of the first piston 26. The first balancing dam chamber 30 may be defined between the first internal surface 64 and the second internal surface 66. The first protrusion 60 may extend from the first internal surface 64 of the first piston 26 and into the first balancing dam chamber 30. The first spring retainer 36 may be positioned such that a backside (or back surface) of the first spring retainer 36 comes into contact with the second internal surface 66 of the first backing plate 32. More specifically, the backside of the first spring retainer 36 may be secured to the second internal surface 66 of the first backing plate 32. A front side (or front surface) of the first spring retainer 36 may face the first internal surface 64 of the first piston 26. The front side of the first spring retainer 36 may have a contour or profile 68, where at least a portion of the profile 68 is substantially parallel with the first internal surface 64 of the first piston 26. Substantially parallel may include any deviation from parallel that ranges from 0 mm to 3 mm.

The first spring retainer 36 may define a first orifice (or plurality of first orifices) 70 between an inner diameter 72 of the first spring retainer 36 and an outer diameter 74 of the first spring retainer 36. The first compression spring (or plurality of first compression springs) 34 may be disposed within the first orifice 70 along with being disposed within the first pocket 62 defined by first protrusion 60 of the first piston 26. The first spring retainer 36 may include a first projection (or plurality of first projections) 76 that extends from the first orifice 70 and into the first balancing dam chamber 30 beyond an end of the first protrusion 60 of the first piston 26. The first projection 76 may also be positioned internally relative to an inner diameter 78 of the first compression spring 34. The first spring retainer 36 may also include a second projection 80 between the first orifice 70 and the outer diameter 74 of the first spring retainer 36. The second projection 80 may also extend into the first balancing dam chamber 30 beyond an end of the first protrusion 60 of the first piston 26. The first spring retainer 36 may further include a third projection 82 between the first orifice 70 and the inner diameter 72 of the first spring retainer 36. The third projection 82 may also extend into the first balancing dam chamber 30 beyond an end of the first protrusion 60 of the first piston 26. The third projection 82 may extend along an angle towards the first backing plate 32, such that the thickness of the third projection decreases as you move radially inward from the first orifice 70 to the inner diameter 72 of the first spring retainer 36, in order to direct hydraulic fluid into the first balancing dam chamber 30.

The second piston 40 may include a second protrusion 84 that extends into the second balancing dam chamber 44. The second protrusion 84 may define a second pocket 86 within the second balancing dam chamber 44. The second pocket 86 may be sized to receive the second compression spring 48. The second compression spring 48 may be disposed within the second pocket 86. The second spring retainer 50 may be disposed within the second balancing dam chamber 44. The second spring retainer 50 may extend from the second backing plate 46 and into the second balancing dam chamber 44 beyond an end of the second protrusion 84. The second piston 40 may have a third internal surface 88. The second backing plate 46 may have a fourth internal surface 90 that opposes the third internal surface 88 of the second piston 40. The second balancing dam chamber 44 may be defined between the third internal surface 88 and the fourth internal surface 90. The second protrusion 84 may extend from the third internal surface 88 of the second piston 40 and into the second balancing dam chamber 44. The second spring retainer 50 may be positioned such that a backside (or back surface) of the second spring retainer 50 comes into contact with the fourth internal surface 90 of the second backing plate 46. More specifically, the backside of the second spring retainer 50 may be secured to the fourth internal surface 90 of the second backing plate 46. A front side (or front surface) of the second spring retainer 50 may face the third internal surface 88 of the second piston 40. The front side of the second spring retainer 50 may have a contour or profile 92, where at least a portion of the profile 92 is substantially parallel with the third internal surface 88 of the second piston 40. Substantially parallel may include any deviation from parallel that ranges from 0 mm to 3 mm.

The second spring retainer 50 may define a second orifice (or plurality of second orifices) 94 between an inner diameter 96 of the second spring retainer 50 and an outer diameter 98 of the second spring retainer 50. The second compression spring (or plurality of second compression springs) 48 may be disposed within the second orifice 94 along with being disposed within the second pocket 86 defined by second protrusion 84 of the second piston 40. The second spring retainer 50 may include a fourth projection (or plurality of fourth projections) 100 that extends from the second orifice 94 and into the second balancing dam chamber 44 beyond an end of the second protrusion 84 of the second piston 40. The fourth projection 100 may also be positioned internally relative to an inner diameter 101 of the second compression spring 48. The second spring retainer 50 may also include a fifth projection 102 between the inner diameter 96 and the outer diameter 98 of the second spring retainer 50. The fifth projection 102 may also extend into the second balancing dam chamber 44 beyond an end of the second protrusion 84 of the second piston 40. The fifth projection 102 may extend along an angle towards the second backing plate 46, such that the thickness of the third projection decreases as you move radially inward from the outer diameter 98 toward the inner diameter 96 of the second spring retainer 50, in order to direct hydraulic fluid into the second balancing dam chamber 44.

The first spring retainer 36 and the second spring retainer 50 are configured to reduce the fill volumes (the amount of space that receives hydraulic fluid when the clutches are being operated) of the first balancing dam chamber 30 and the second balancing dam chamber 44, respectively. The first spring retainer 36 and the second spring retainer 50 reduce the fill volumes of the balancing dam chambers by occupying a portion of the total volume of the balancing dam chambers. The first spring retainer 36 may occupy anywhere from 20% to 90% of the volume of the first balancing dam chamber 30. The second spring retainer 50 may occupy anywhere from 20% to 90% of the volume of the second balancing dam chamber 44. The time required to fill the balancing dam chambers is therefore reduced since a smaller volume of the balancing dam chambers needs to be filled when the clutches are operational. Reducing the time required to fill the balancing dam chambers may advantageous in clutches used in transmissions or transaxles for vehicles that have an engine auto start/stop function which cuts off the supply of hydraulic fluid when the engine stopped.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A clutch comprising:
   a piston and a backing plate defining a balance chamber therebetween, the piston having a protrusion extending into and defining a pocket in the chamber;
   a spring disposed within the pocket and configured to disengage the piston from a clutch pack; and
   a spring retainer,
      disposed between the spring and the backing plate, extending from the backing plate into the chamber,
      defining an orifice between inner and outer diameters of the retainer, wherein the spring is disposed within the orifice, and
      having a first projection between the orifice and the inner diameter of the retainer that extends into the chamber beyond an end of the protrusion when the piston is disengaged.

2. The clutch of claim 1 wherein the retainer has a second projection that extends from the orifice, internal relative to an inner diameter of the spring, and into the chamber beyond the end of the protrusion when the piston is disengaged.

3. The clutch of claim 1, wherein the first projection of the retainer extends along an angle toward the backing plate to direct flow of hydraulic fluid into the chamber.

4. The clutch of claim 1, wherein a surface of the retainer, that extends into the chamber and faces an internal surface of the piston, has a profile that parallels the internal surface of the piston.

5. A clutch comprising:
   a piston having a first internal surface opposing a second internal surface of a backing plate, the first and second internal surfaces defining a balancing chamber therebetween, the first internal surface having a protrusion extending into and defining a pocket in the chamber;
   a spring retainer,
      disposed within the chamber,
      secured to the second internal surface,
      having a profile that faces and parallels the first internal surface,
      defining an orifice between inner and outer diameters of the retainer, and
      having a first projection that extends from the orifice, internal relative to an inner diameter of a spring that is disposed with orifice, and into the chamber beyond an end of the protrusion when the piston is disengaged.

6. The clutch of claim 5, wherein the retainer has a second projection between the orifice and the inner diameter of the retainer that extends into the chamber beyond the end of the protrusion when the piston is disengaged.

7. The clutch of claim 6, wherein the second projection of the retainer extends along an angle toward the backing plate to direct flow of hydraulic fluid into the chamber.

8. A clutch comprising:
   a piston and a backing plate defining a chamber therebetween, the piston having a protrusion extending into the chamber;
   a spring retainer,
      secured to the plate within the chamber,
      defining an orifice between inner and outer diameters of the retainer, and
      having a projection that extends from the orifice and into the chamber beyond the protrusion when the piston is disengaged; and
   a spring disposed around the protrusion within the orifice.

* * * * *